United States Patent [19]
Jordan

[11] Patent Number: 5,278,934
[45] Date of Patent: Jan. 11, 1994

[54] THROUGHPUT MAXIMIZING SYSTEMS FOR SUBSTANTIALLY UNIMODAL THROUGHPUT PROFILES

[75] Inventor: Scott C. Jordan, Huntington Beach, Calif.

[73] Assignee: Newport Corporation, Irvine, Calif.

[21] Appl. No.: 671,268

[22] Filed: Mar. 18, 1991

[51] Int. Cl.$^5$ .............................................. G02B 27/00
[52] U.S. Cl. ...................... 385/147; 385/13; 356/376; 359/896; 359/900
[58] Field of Search ............... 350/96.20; 356/376; 385/147, 902, 12, 13, 30, 31, 32; 359/896, 900

[56] References Cited

U.S. PATENT DOCUMENTS

| | | | |
|---|---|---|---|
| 4,708,483 | 11/1987 | Lorenz | 350/376 |
| 4,720,163 | 1/1988 | Goodwin et al. | 350/96.20 |
| 4,901,221 | 2/1990 | Kodosky et al. | 364/200 |
| 4,914,568 | 4/1990 | Kodosky et al. | 364/200 |

FOREIGN PATENT DOCUMENTS 1247845 1/1989 Canada.
0130944 6/1984 European Pat. Off..

OTHER PUBLICATIONS

T. Edye et al., "Automatic Alignment Station for Single or Multimode Optical Fibers", SPIE vol. 483, Optical Alignment II (1984), pp. 65 to 69.
T. Edye et al, "Automatic Assembling Station for Guided Optic Components", SPIE vol. 483, Optical Alignment II (1984), pp. 70 to 75.
John C. Goodwin, "Dynamic Alignment of Small Optical Components" Journal of Lightwave Technology, vol. LT-5, Jan. 1987, pp. 97 to 101.
Nanotrak Brochure, by Photon Control Limited Feb. 26, 1991.

Primary Examiner—John D. Lee
Assistant Examiner—Phan T. Heartney
Attorney, Agent, or Firm—Benoit Law Corporation

[57] ABSTRACT

Throughput between two objects of light or another physical quantity having a substantially unimodal throughput profile in terms of relative orientation of said objects, is maximized. To this end, the physical quantity is initially transmitted between the objects at other than optimum throughput in the substantially unimodal throughput profile, and relative movement in loops in the substantially unimodal throughput profile is imposed on the objects. Throughput intensities are detected at different specific points along the loops, and detected throughput intensities are arranged at corresponding different specific points in an array, from which the relative orientation of the objects at which a maximum throughput has occurred is identified. A discrepancy may be displayed or the objects are moved unto that optimum relative orientation. The process may be reiterated until maximum throughput has been achieved, at least within an acceptable tolerance.

20 Claims, 11 Drawing Sheets

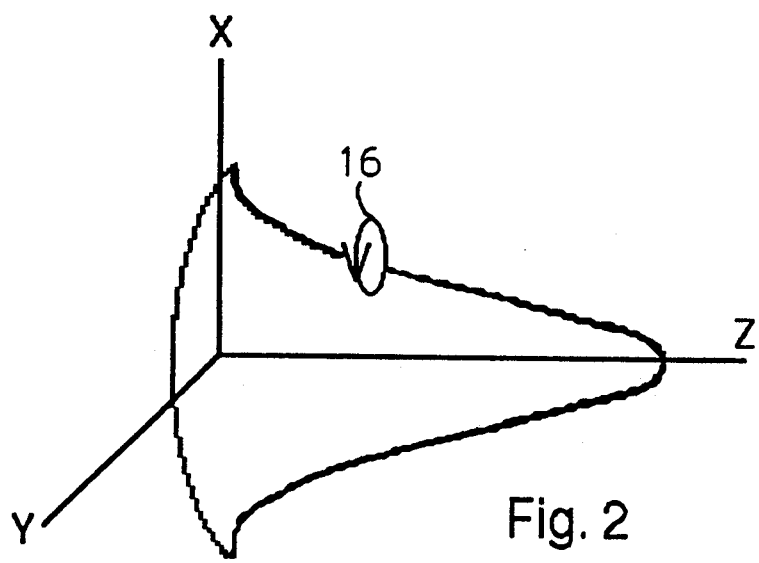
Fig. 2
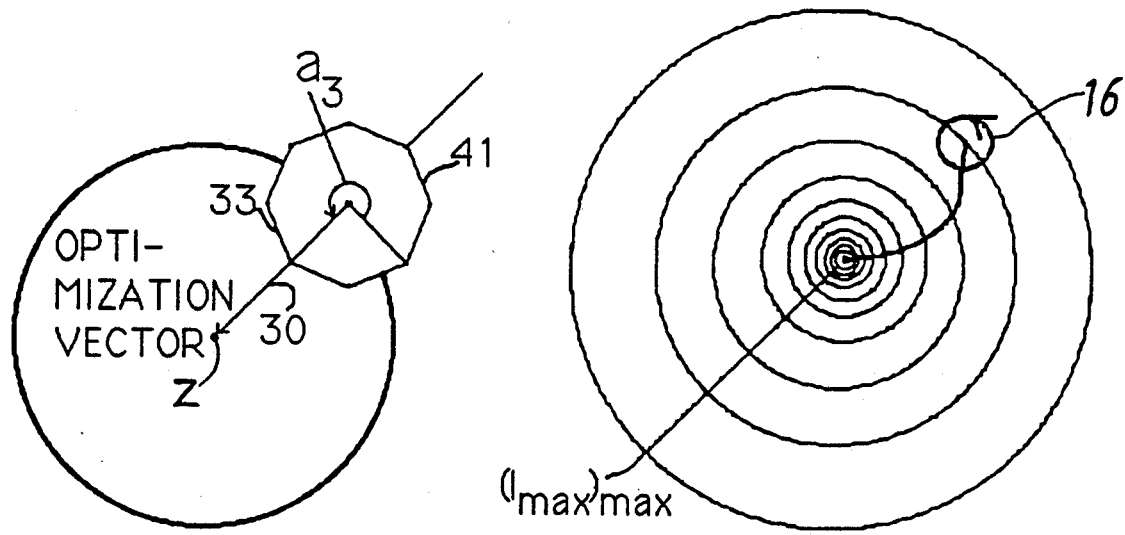
Fig. 3
Fig. 5

THROUGHPUT MAXIMIZING SYSTEMS FOR SUBSTANTIALLY UNIMODAL THROUGHPUT PROFILES

BACKGROUND OF THE INVENTION

1. Field of the Invention

The invention relates to methods and apparatus for maximizing throughput between objects, of a physical quantity having a substantially unimodal throughput profile in terms of relative orientation of such objects. Examples include an alignment and position stabilization of optical fibers, light sources and fibers, fibers and light input devices, semiconductor wafers and microlithographic photo masks, electrical, tunneling and atomic force microprobes and their substrates, spatial filters and free-space laser beams, pinholes and focused beams, laser plasma tubes and external cavity resonators, to name but a few examples.

2. Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of a pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose of providing antecedents for the remainder of a statement of invention or claim.

On Jun. 24, 1983, the Fondation Suisse Pour La Recherche En Microtechnique filed the Swiss Patent Application CH 3444/83 which formed the basis for their European Patent Application 84810298.4, filed Jun. 21, 1984 and published Jan. 9, 1985 under publication number 0,130,6,944, for a method of alignment of a wave guide. Reference may also be had to their corresponding Canadian Patent 1 247 845, issued Jan. 3, 1989, and to articles by T. Edye et al, entitled "Automatic Alignment Station for Single or Multimode Optical Fibers", and "Automatic Assembling Station for Guided Optic Components," SPIE Vol. 483, Optical Alignment II (1984), pp. 65 to 75.

Briefly, that method of alignment imposes a movement to either the excitation unit or the wave guide, which follows a loop in a plane transverse to a connection axis of the wave guide and the excitation unit. Maximum and minimum values of the excitation function are measured by analog circuitry which provides instantaneous orthogonal components of the throughput profile gradient. The other element is moved along these axes until the components of the gradient are zero, when alignment has been achieved.

A similar approach is apparent from U.S. Pat. No. 4,720,163, by John C. Goodwin et al, issued Jan. 19, 1988, for a laser-fiber positioner. Reference may in this respect also be had to an article by John C. Goodwin, entitled "Dynamic Alignment of Small Optical Components", Journal of Lightwave Technology, Vol. LT-5, January 1987, pp. 97 to 101.

Apparatus according to these prior disclosures have been manufactured and are in operation. An automatic alignment for single mode fibers and integrated optical devices has been provided by PHOTON CONTROL LIMITED, as apparent from their brochure entitled NANOTRAK, which mentions that they are using a radar tracking technique known as "Conical Scanning," whereby a servo controlled system continually positions a source on target.

One problem with these systems is lack of versatility, which in effect limits the utility of each apparatus produced pursuant to the above mentioned prior disclosures practically to the given application for which it was specifically designed.

SUMMARY OF THE INVENTION

It is a general object of the invention to provide alignment methods and apparatus of high versatility.

It is a germane object of the invention to maximize throughput between objects, of a physical quantity having a substantially unimodal throughput profile, in an improved and more generally applicable manner.

It is a related object of the invention to provide throughput maximizing systems that are generally applicable to all kind of tasks where the optimum of a physical quantity having a substantially unimodal throughput profile is to be transmitted between objects.

Other objects of the invention will become apparent in the further course of this disclosure.

The invention resides in methods and apparatus for maximizing throughput between two objects, of a physical quantity having a substantially unimodal throughput profile in terms of relative orientation of said objects, comprising in combination, the steps of, or means for, transmitting that physical quantity between the objects at other than optimum throughput in the substantially unimodal throughput profile, imposing on the objects relative movement in loops in the substantially unimodal throughput profile, detecting throughput intensities at different points along the loops, arranging detected throughput intensities at corresponding different specific points in an array, and identifying from that array the relative orientation of the objects at which a maximum throughput has occurred. The objects are moved unto that relative orientation.

Within the scope of the invention, a discrepancy between an actual relative orientation and the relative orientation of the objects at which maximum throughput will occur, may be displayed, such as an aid to physical alignment or for any other purpose.

If desired or necessary, relative movement of the objects is continued in further loops from an identified relative orientation. Further throughput intensities are detected at further different specific points along such further loops, detected further throughput intensities and corresponding further different specific points are arranged in a further array, and there is identified from that further array a further relative orientation of the objects at which a further maximum throughput has occurred during that continuing relative movement. The objects may then be moved unto said further relative orientation, and so forth, until an optimum throughput has been achieved.

For speed, accuracy and versatility, the different specific points at which throughput intensities are detected preferably are identified by their polar angles or coordinates in the loops of relative movement. Such detected throughput intensities are arranged in terms of their corresponding polar angles or coordinates in an array from which the polar angle or coordinate at which an extreme throughput intensity has occurred is identified. The objects may then be relatively moved unto a relative orientation for maximum throughput along a vector having that polar angle or coordinate. As indicated above, that process may be reiterated progressively, until the desired throughput has been achieved.

Methods and apparatus as herein defined are not intended to be limited to a particular order of recitation of steps or elements. For instance, if a method step or element is herein recited ahead of another step or element, no limitation is intended by such order of recitation, as long as the particular combination is operative with an antecedent step or element following a subsequently recited step or element. Such a reversal or rearrangement of steps or elements is intended to be covered by the claim or claims defining that combination, unless the rearranged combination of steps or elements would be inoperative or unless the invention is disclosed as residing in the recited order of steps or elements.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 2 depicts a unimodal throughput profile in terms of relative orientation of the kind of objects shown in FIG. 1;

FIG. 3 is a top view of FIG. 2, illustrating throughput optimization,

FIG. 5 is a view similar to FIG. 3, providing a contour map of a progressive optimization according to a preferred embodiment of the invention.

DESCRIPTION OF PREFERRED EMBODIMENTS

Figure 1:
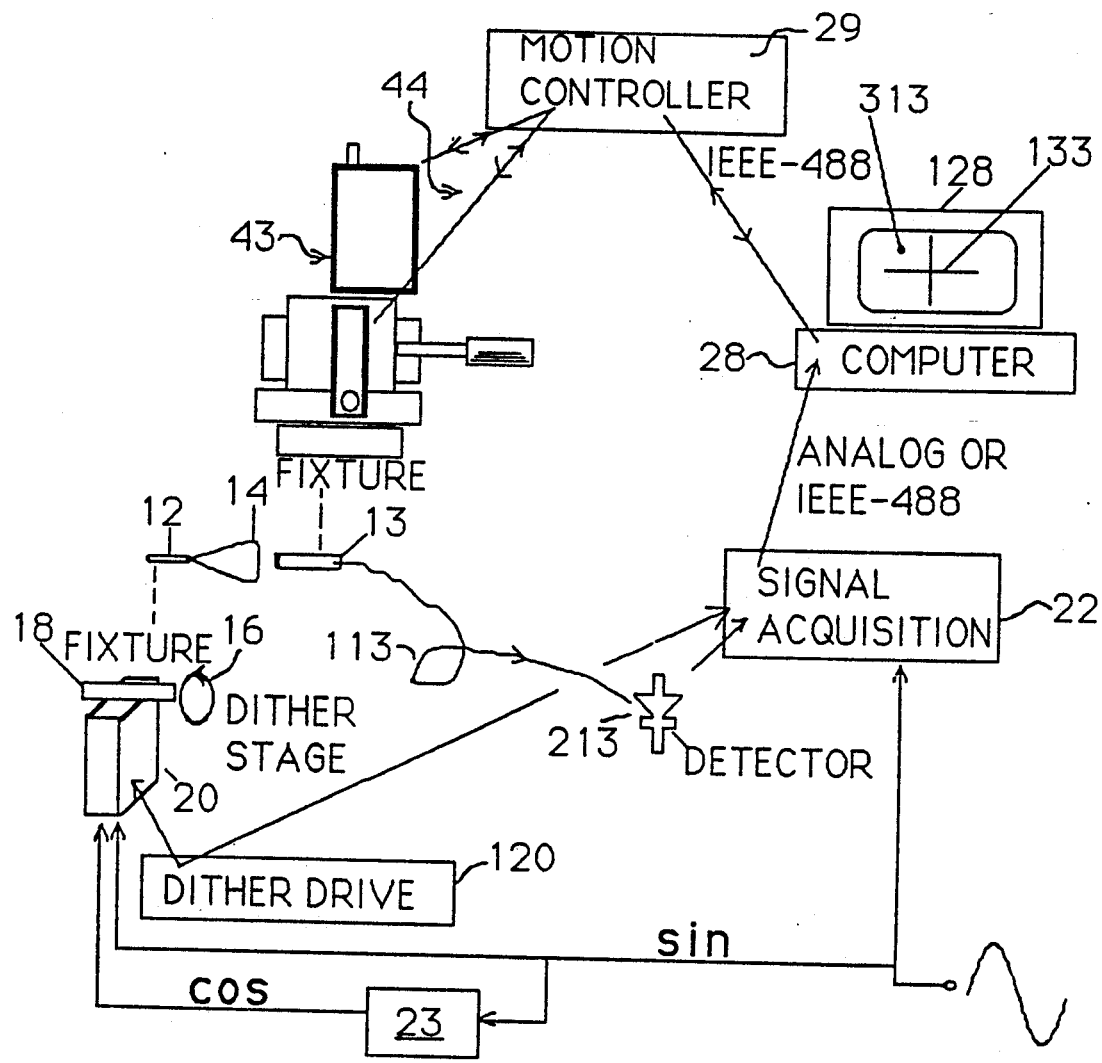
FIG. 1 is a block diagram of a system for maximizing throughput between objects according to an embodiment of the subject invention.

FIG. 1 uses the example of a radiation source 12 and a radiation receiver 13 for a disclosure of methods and apparatus 10 for maximizing throughput between two objects, of a physical quantity having a substantially unimodal throughput profile in terms of relative orientation of such objects 12 and 13.

By way of example, the source 12 may be or include a light-emitting or laser diode, with or without output lens or fiber, while the object 13 may be an optical detector, an optical fiber or an input face thereof or a fiber coupler therefor. By way of example, FIG. 1 shows a fiber pigtail 113 between the relatively moveable device and a photo or similar detector 213.

Mutual alignment of sources and receivers of light and other radiation is a presently typical example, but the invention is not so limited, but is rather versatile as to application and utility. For instance, the subject invention may be employed to align a reference mark or aperture on a semiconductor wafer or other object 12 to an aperture, micro-lens or fiber 13 in a microlithographic mask fixturing apparatus. By way of example and not by way of limitation, further examples of the utility of the subject invention include alignment or position stabilization of semiconductor wafers and microlithographic photo masks, electrical, tunneling and atomic force microprobes and their substrates, spatial filters and free-space laser beams, pinholes and focused beams, laser plasma tubes and external cavity resonators, to name but a few examples.

As apparent from FIG. 1, the light or other physical quantity proceeds from the source of source fiber 12 in approximately the form of a cone 14. A typical emission intensity profile may be represented by a bell-shaped curve, as shown in FIG. 2, for instance, with its intensity maximum on its optical axis z.

Alternatively, FIG. 2 may be viewed as a throughput profile in terms of relative orientation of the objects 12 and 13. That throughput profile according to FIG. 2 is unimodal, but the invention is workable with other intensity or throughput profiles, as long as they have a sufficiently unimodal characteristic to prevent the apparatus from locking in on a false maximum.

The coupling or throughput efficiency between 12 and 13 is critically dependent on achieving and maintaining minimum misalignment. For example, if objects 12 and 13 are optical fibers, the maximum tolerable misalignment may be less than one micron. Specific applications, such as aligning single-mode fibers or a fiducial mark or pinhole on a semiconductor wafer, may have even lesser misalignment tolerances. On the other hand, in multi-mode fiber work and in other applications with above-five-micron or larger tolerances, apparatus actually used in the prior art may not be able to effect needed alignments. The subject invention addresses and solves these problems efficiently through preferred embodiments thereof.

The light or other physical quantity of interest is initially transmitted between the objects 12 and 13 at other than optimum throughput in the substantially unimodal throughput profile. For instance, as shown at 16 in FIGS. 2 and 3, the transmission starts at a point or in a region offset from the central axis z. Relative movement is imposed on the objects 12 and 13 in loops at 16 in the substantially unimodal throughput profile. Such movement is thought to be relative, since either the object 12 or the object 13 could be relatively stationary, while the other object is moving. Also, within the scope of the invention, neither object need to be stationary, since both objects 12 and 13 could be moving relative to each other and relative to a fixed point or support. The imposition of such relative movement may start ahead of the recited transmission of the physical quantity and may continue during such transmission, as desired or necessary.

In the embodiment shown in FIG. 1, the first object 12 is shown mounted on or connected to a first fixture 18 for imposing the loop-like motion 16. Conversely, the second object 13 is shown as mounted on or connected to a second fixture 19 for moving that object to a desired position or orientation for optimum throughput. Of course, since such movement and orientation are relative as between the object 12 and 13, other arrangements are within the scope of the invention.

The scope of the invention extends, but is not limited to, the use of a conventional stage 20 for imposing on the objects 12 and 13 relative movement in loops, in combination with the other steps or elements as herein disclosed. Relative movement in loops in the substantial unimodal throughput profile may alternatively be effected in a novel manner within the scope of the invention, as mentioned more fully below in connection with the dither drive 120.

However, for many applications the piezo-ceramic transducer arrangement shown in FIGS. 1 of the above mentioned Canadian and European patents may be employed to impose circular motion of the type shown in FIGS. 2 of those patents.

The x-y transducers or drivers of stage 20 may be energized by a sine wave and a cosine wave energization signal, respectively. The sine wave energization for one of the transducers or drivers may be derived from 50 Hz or 60 Hz line current, as the case may be, and is also applied to the signal acquisition component 22 for reasons more fully apparent from FIG. 4. Cosine energization may be produced by a phase shifting component, such as a differentiator or a 1:1 transformer supplying in response to a sine wave input at the primary winding a cosine output at the secondary winding for driving the second one of the x-y transducers or drivers in the dither stage, resulting in circular relative object motion 16.

A detector 213, which may be of a conventional type, is employed in the embodiment of FIG. 1 to detect intensities of the throughput between the relatively moving objects 12 and 13.

A salient problem of the prior art at this point has been an entrenched orientation in terms of development of the requisite adjustment signal by a process involving phase detection. This may go back to radar tracking technology, as mentioned in the above mentioned NANOTRAK brochure. The above mentioned Canadian and European patents develop their disclosed gradient in this manner, and Goodwin et al also employ a phase detection approach, and the above mentioned Goodwin article even discusses the superiority of its derivative signal over any software driven scheme in which a search pattern must be performed to achieve the desired goal.

Figure 4:
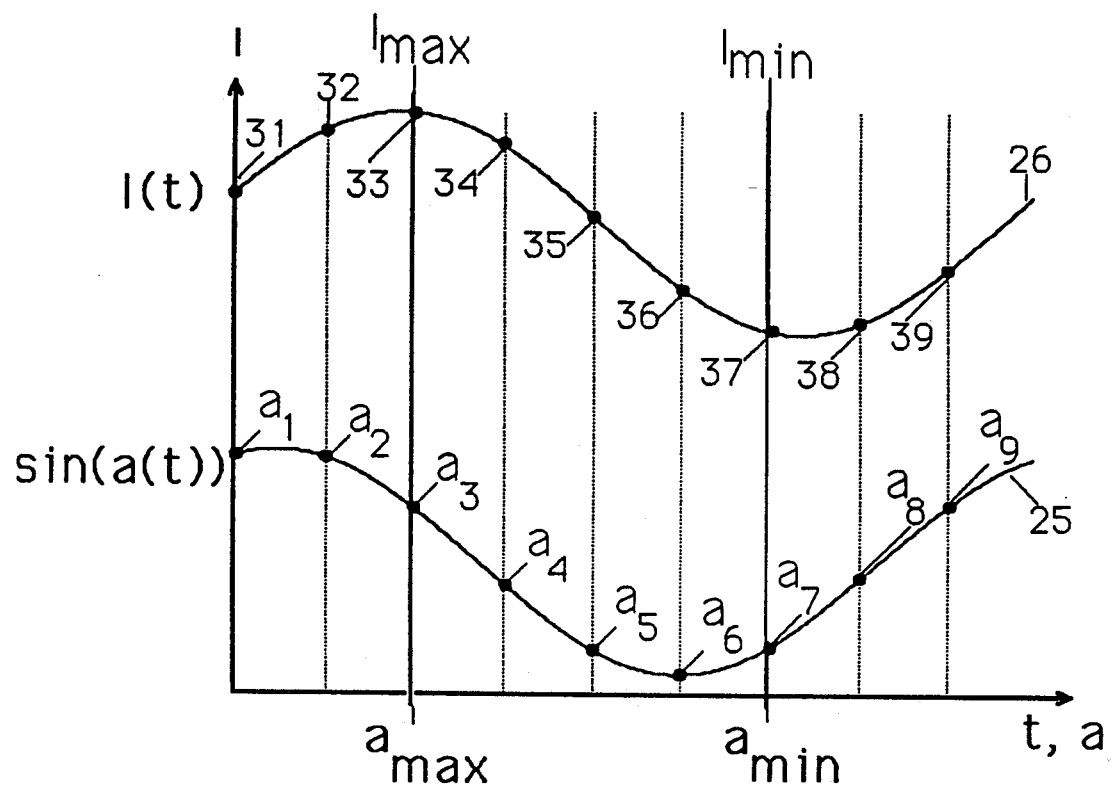
FIG. 4 is a graph illustrating data acquisition according to a preferred embodiment of the invention for throughput maximization.

In radical departure from phase detection type signal acquisition, the subject invention detects throughput intensities at different points along the dither or loops of relative motion. A preferred embodiment of this approach is illustrated in FIG. 1, where a first curve 25 illustrates the sine wave applied to the dither stage 20 and as a synchronization signal also to the signal acquisition component 22. A second curve 26 in FIG. 4 depicts throughput intensity as a function of time. In the illustrated embodiment, a detector 213 is employed to detect such intensity of the throughput light or other physical quantity.

Discrete points 31 through 39 are shown in FIG. 4 as different specific points along the loops 16 at which throughput intensities are detected, such as with the disclosed signal acquisition 22 and detector 213 combination.

The signal acquisition 22 and computer 28 combination arranges detected throughput intensities at corresponding different specific points in an array. For instance, if the intensities depicted in FIG. 4 at discreet points 31 through 39 would be labeled as $I_1$ through $I_9$, a suitable array could read:

$$A = I_1(31), I_2(32), I_3(33), I_4(34), I_5(35), I_6(36), I_7(37), I_8(38), I_9(39) \quad (1)$$

Within the scope of the invention, such array determines the location of each point in some manner, so that the computer 28 and motion controller 29 combination are capable of moving the object 13 unto the point where a maximum throughput intensity occurred in the particular array. In principle, this could be accomplished by synchronized timing or by noting coordinates of each point 31 through 39.

In accordance with a preferred embodiment of the invention, points of maximum throughput are identified by their polar coordinates in the loops 16. For instance, occurrence of different specific points at which throughput intensities are detected is determined in terms of different polar angles in or along the loops 16. Such detected throughput intensities are arranged in terms of corresponding different specific angles in an array. The signal acquisition 22 and computer 28 combination may again be used for that purpose.

If the angular component of each polar coordinate is designated by a letter a, the resulting array may by written as follows in terms of FIG. 4;

$$A = I_1(a_1), I_2(a_2), I_3(a_3), I_4(a_4), I_5(a_5), I_6(a_6), I_7(a_7), I_8(a_8), I_9(a_9) \quad (2)$$

As apparent from FIG. 4, and as also indicated in FIG. 3, the specific point at which the maximum throughput $I_{max}$ occurred in that particular scan is the point 33 or the polar coordinate angle $a_3$.

A human operator or the computer can, of course, identify that point 33 or angle $a_3$ by comparing the different determined throughput intensities. This may be expressed as identifying from the array the relative orientation of the objects 12 and 13 at which a maximum throughput has occurred in the particular loop or cycle. In this respect, the loops may, but need not necessarily be, elliptical or circular. By way of example, FIG. 3 illustrates movement in a polygonal loop, with the above mentioned points of throughput intensity detection being located at the apices of the relative motion polygon 41. Accordingly, it is not necessary to employ sinusoidal energization, when a polygonal motion will do. Rather, FIG. 1 shows a general dither drive 120 that may, for instance, operate pursuant to software herein disclosed. Such drive may proceed in a closed-loop or even in an open-loop manner.

The excitation of the relative object movement may be so high in frequency as to require detection of throughput intensities only once per loop or only once per several loops. In such cases, intensity detections are effected aperiodically, rather than on a "once around" or similar basis, which would yield practically identical throughput intensities along a helical, spiral or other multi-turn loop. In this respect, the expression "different specific points" is intended to exclude detection at points which are functionally equivalent as between neighboring points, even though spread over several loops.

As may be deduced from FIGS. 4 to 5, the throughput intensity values at points 31 through 39 or angles $a_1$ through $a_9$ typically will follow a sinusoidal function. However, other functions are possible within the scope of the subject invention depending on the manner of relative movement in what still may be called loops, even if such movement is neither elliptical nor proceeds in closed geometrical figures.

A preferred embodiment of the invention identifies from the detected throughput intensity values or from one of the above mentioned arrays the relative orientation of the objects 12 and 13 at which a maximum throughput $I_{max}$ has occurred. In practice, this may be done by relying either on the detected $I_{max}$ or $I_{min}$, since the relative orientation for maximum throughput can be identified from either of these extremes. Within the scope of the invention, the coordinate of a desired extreme throughput intensity may be arrived at by calculation from a specific determined intensity.

In cases where the minimum detected throughput intensity is a diametrical opposite of the maximum throughput intensity detected during that cycle, the line or vector along which, say, the object 13 has to be moved relative to the object 12 for throughput maximization, can be determined from a detection or calculation of the minimum throughput intensity from the particular array.

For instance, when the detected throughput intensities and corresponding polar coordinates are arranged in an array from which the polar coordinate at which an extreme throughput intensity has occurred is identified, the object 12 and 13 may be relatively moved unto a relative orientation for maximum throughput along a vector 30 having that polar coordinate.

For instance, the maximum throughput intensity in the particular array may be selected as the above mentioned extreme throughput intensity, and the vector of movement then is the vector having the polar coordinate at which that maximum throughput intensity occurred. Alternatively, the minimum throughput intensity in the array may be selected as the extreme throughput intensity, and the vector may be determined as substantially a 180° reversal of the polar coordinate at which that minimum throughput intensity $I_{min}$ occurred.

At this point, a discrepancy between an actual relative orientation of the objects 12 and 13 and the relative orientation of these objects at which maximum throughput intensity has occurred may be displayed on an enlarged scale, such as shown in the computer display 128 in FIG. 1, where the circle 313 displays the actual relative position of the object 13, while a cross hair 113 indicates the relative orientation of the objects 12 and 13 at which a maximum throughput intensity was detected in the particular run.

Based on that information, the observer or operator may then either reject the particular combination of objects 12 and 13, or boost the power of radiation 14, or he or she may manually adjust the relative position of objects 12 and 13 in cases where that is physically possible. A position adjustment stage 43 may be employed for that purpose. On the other hand, as indicated by lines 44, the motion controller 29 may effect the maximizing adjustment of the relative orientation of objects 12 and 13 under the control of the computer 28. The display 113/313 may then not be necessary, though it may still be helpful to the operator or observer.

The objects 12 and 13 are relatively moved along the vector pertaining to the detected maximum throughput, determined either from the maximum intensity throughput or indirectly from the minimum intensity throughput or by calculation from another specific throughput intensity determined during that cycle.

Pursuant to a preferred embodiment of the invention, the objects 12 and 13 are relatively moved along the maximum throughput vector in accordance with $$d = G(I_{max} - I_{min})/I_{min} \tag{3}$$

wherein:
d is distance of movement,
G is gain of motion,
$I_{max}$ is a maximum throughput intensity, and
$I_{min}$ is a minimum throughput intensity detected during relative movement of objects 12 and 13.

The gain of motion, G, may be selected by the user for optimum efficiency of the optimization process.

Within the scope of the invention, a polar coordinate adjustment stage could be used at 43, in which case one of the lines 44 would transmit the extreme or maximum throughput intensity angle, such as $a_3$ or $a_{max}$, while the other line transmits a signal effecting adjustment along the vector having that angle, preferably by the above mentioned distance d. Motor-driven actuators may be used in the adjustment stage 43 for that purpose.

On the other hand, an XY motion and position adjustment stage may be employed at 43, in which case the computer 28 resolves the maximum throughput intensity vector angle and corresponding distance of motion, d, for adjustment of the XY actuators of the stage 43. As part of its versatility, the subject invention is also suitable for adjusting the relative orientation of the objects in the z-axis or in terms of angular orientation or otherwise spatially.

In some cases, the computer 28 can simply calculate the extent of relative motion necessary for achieving a satisfactory throughput for a given application. Particularly for well-characterized devices, the requisite amount of motion for optimum throughput may be uniquely determined by $I_{max}$ and/or $I_{min}$ or by some other calculation based on the contents of the intensity array. In that case, the amount of motion could be preprogrammed, such as by a command, "If the maximum intensity is Q, then move 13 s microns in the direction of $a_{max}$ to reach optimum throughput."

In the more general case, the process is incrementally reiterated until optimum throughput has been achieved. Equation (3) may be used as an algorithm for that purpose. Optimum relative orientation or alignment may be declared as having occurred when $I_{min}$ has become equal to $I_{max}$ within a desired tolerance.

Within the scope of the invention, relative movement of objects 12 and 13 in further loops 16 may be continued from the relative orientation achieved in a first cycle. Further throughput intensities at further different specific points are detected along such further loops, and such detected further throughput intensities and corresponding further different specific points or their polar coordinates are arranged in a further array. From such further array, a further relative orientation of the objects at which a further maximum throughput has occurred during the continuing relative movement is identified, and the objects are moved unto such further relative orientation. For instance, the polar coordinate at which a further maximum has occurred during the continuing relative movement may be identified from the further array, and the objects 12 and 13 may be relatively moved along a vector having that polar coordinate.

If an algorithm is used in the process, relative movement of the objects 12 and 13, detection of minimum and of maximum throughput intensities, and relative movement of these objects along a vector having the polar coordinate representing an extreme throughput according to that algorithm, such as equation (3) set forth above, may be repeated until $I_{min}$ and $I_{max}$ are substantially equal. Successive loops of relative motion may be progressively diminished or the above mentioned gain of motion, G, may be progressively diminished to prevent overshoots and improve the resolution of the process.

FIG. 5 shows a contour map of a progressive relative movement of object 13 onto the ultimate maximum throughput $(I_{max})_{max}$.

The system 10, or another system within the scope of the invention may be employed for continually monitoring optimum throughput. Real-time tracking of position, compensation of drift and for changing loads may be effected in that manner, and optimum throughput may be continuously maintained.

While not limited to any particular application, the practice of the subject invention is particularly useful in work with optical fibers. As is well known, the fiber geometry and composition determine the discrete set of electromagnetic fields, called modes, which can propagate in the fiber. When light is launched into a fiber, the modes of the fiber are excited to varying degrees depending on the conditions of the launch, including input cone angle, spot size, and axial centration. Radiation modes carry energy out of the core, and such energy is quickly dissipated. The embodiments of the invention can be beneficial for optimizing coupling of light into the fiber, coupling of light from the fiber into an optical cavity, detector or other device, and coupling of light between fibers. What has been said here for light and optical fibers also applies generally to radiation and wave guides.

Prior-art alignment systems were orientated in terms of work with single-mode fibers. The subject invention, however, is easily used with multi-mode fibers and other optical devices as well. This is particularly the case when a polygonal loop motion, such as shown by way of example at 41 in FIG. 3 is used. General-purpose motion devices may then be employed at the dither stage 20. A general-purpose motion device may also be used at the adjustment stage 43 for multi-mode fibers and even for single-mode fibers. The detector 213 may be an optical power meter or other conventional device. A digitizing oscilloscope or other fast data acquisition instrument at 213 is particularly helpful in the case of real-time position optimization of single-mode fibers.

The subject invention is also ideally suited for meeting the increasing requirements of single-mode fibers, which are more and more preferred because of their excellent bandwidth and very low attenuation, but which are rather difficult to work with and require specialized procedures and equipment for coupling and other purposes.

The system may be implemented with conventional components in addition to those already mentioned. Within the scope of the invention, any kind of computer could be employed at 28. The interfaces between signal acquisition 22 and computer 28 and between that computer and the motion controller 29 may also be conventional; IEEE-488 communications interfaces being shown by way of example. Depending on the programming, the signal acquisition and motion controller blocks 22 and 24 may be mainly functional.

In this respect, the invention and its embodiments may be implemented with software using FORTRAN, PASCAL or many other program languages. By way of example and not by way of limitation, specific implementation in LabVIEW and in QuickBASIC are herein specifically disclosed. In this respect, LabVIEW is a programming language in which the flow of data and control is defined graphically, rather than textually. The user interacts with the application via a graphical front panel that simulates a physical instrument which can be manipulated and operated by the user. Such an application is referred to as a "virtual instrument."

For background on LabVIEW, reference may be had to materials of National Instruments, Inc., including their U.S. Pat. Nos. 4,901,221 and 4,914,568, issued Feb. 13 and Apr. 3, 1990 respectively, for Graphical System for Modeling a Process and Associated Method, by Jeffrey L. Kodosky et al, which are herewith incorporated by reference herein.

Figure 6A:
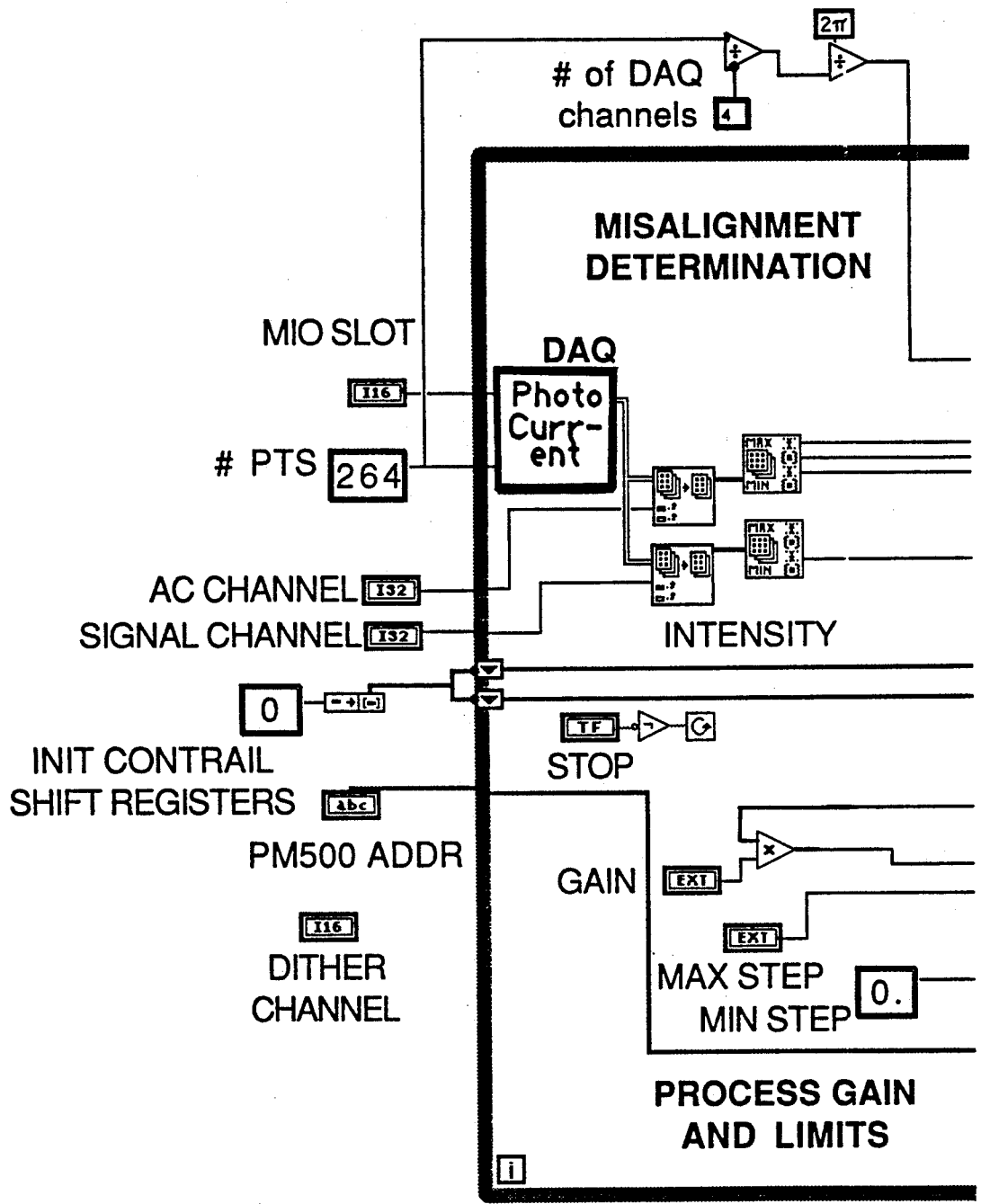
FIGS. 6a and b show the source code of a LabVIEW application program employed in a preferred embodiment of the subject invention, primarily suitable for single-mode fiber throughput maximization.

By reference to that information, FIGS. 6a and b show a source code for maximizing throughput in a single-mode fiber implementation according to a preferred embodiment of the invention with LabVIEW software. FIGS. 7a and b show a corresponding LabVIEW virtual instrument panel that may be displayed on the CRT 128 of the computer according to an embodiment of the invention, for use in conjunction with the LabVIEW software pursuant to FIG. 6.

Figure 8A:
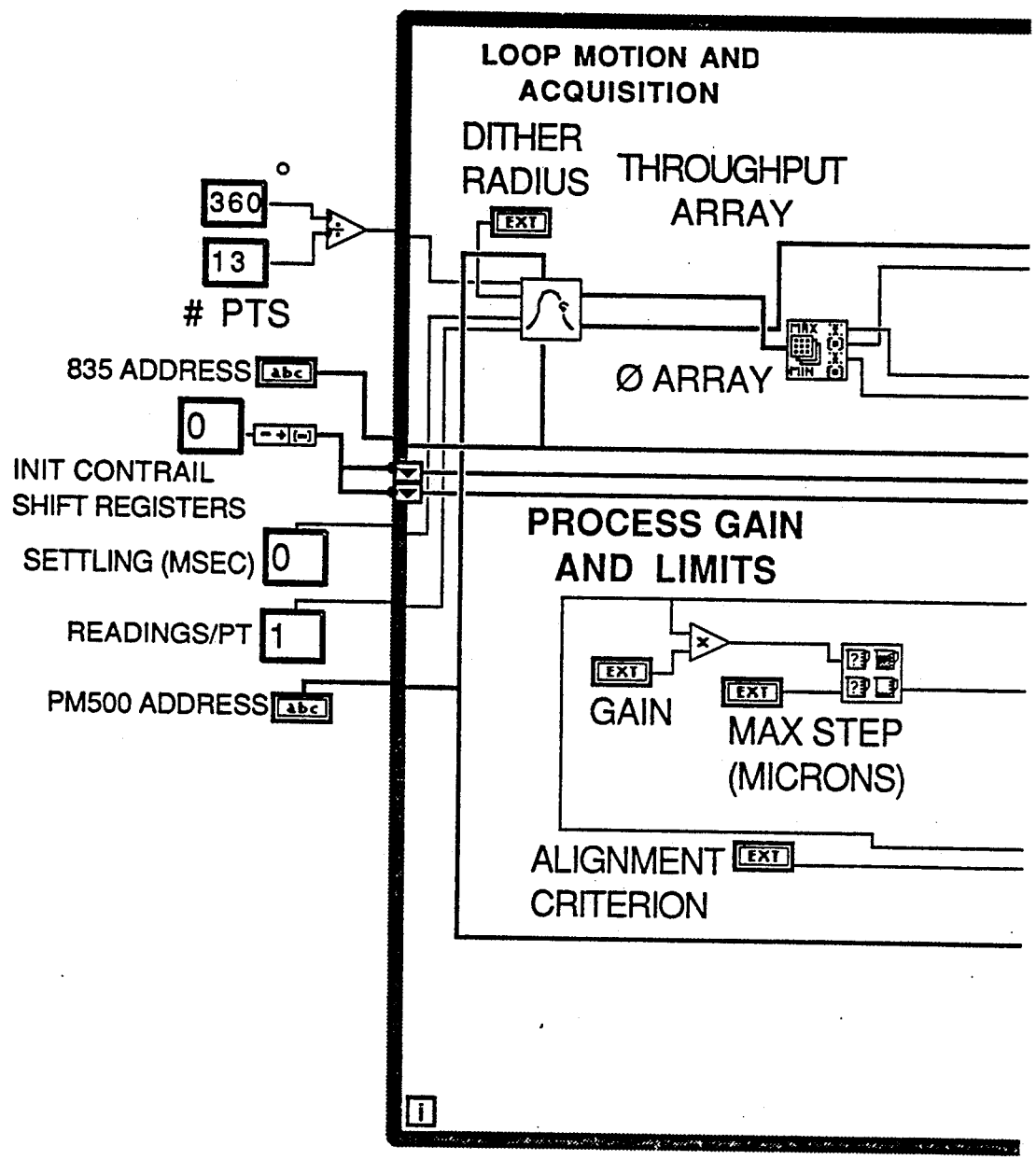
FIGS. 8a and b, show the source code of a LabVIEW application program employed in a preferred embodiment of the subject invention, primarily suitable for multi-mode fiber and multi-micron-scale throughput maximization.

Similarly, FIGS. 8a and b show the source code of a LabVIEW application program for throughput maximization on multi-mode fiber and multi-micron-scale or bulk optics according to another embodiment of the invention.

Figure 9A:
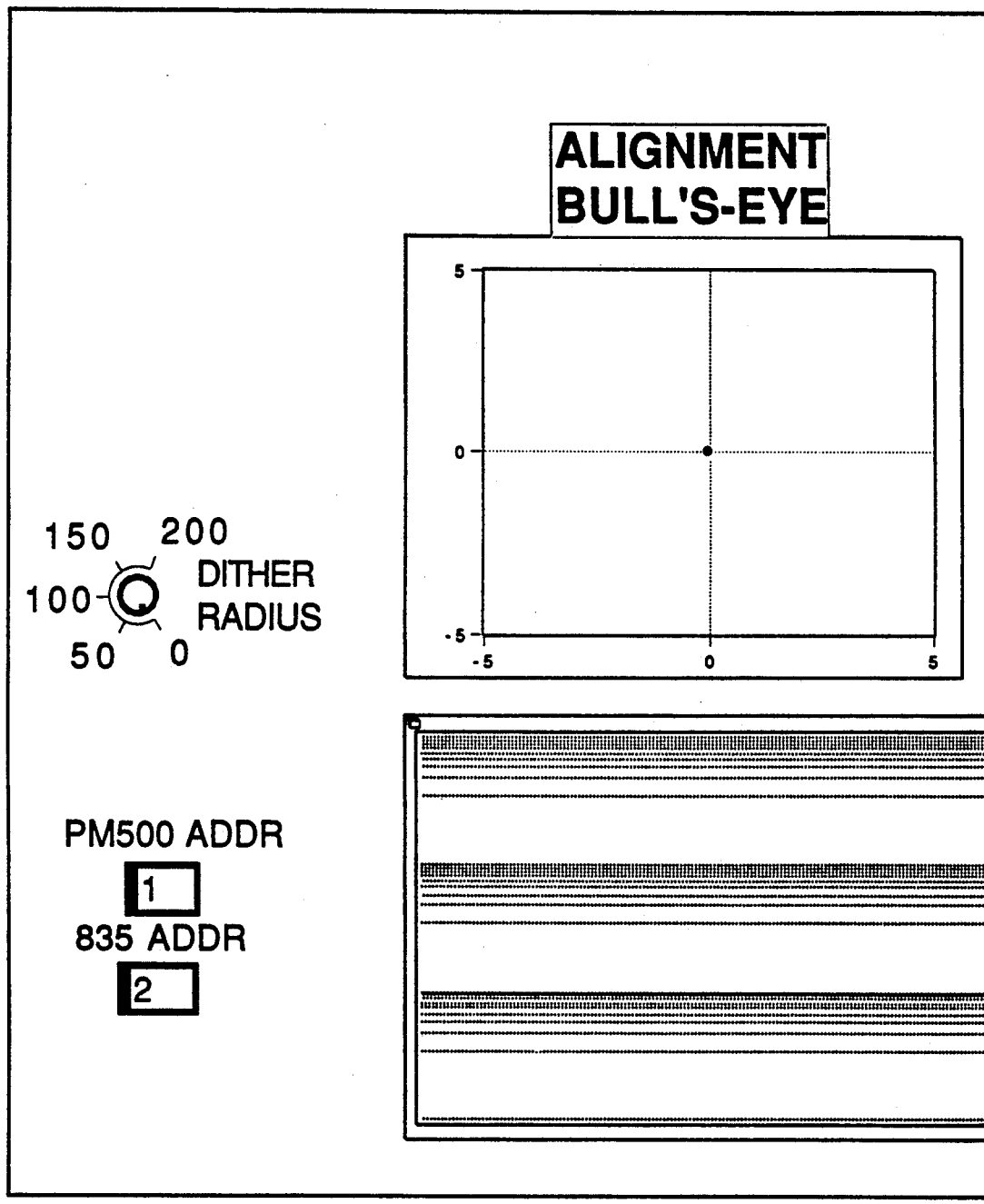
FIGS. 9a and b show a display of a LabVIEW virtual instrument panel according to a related embodiment of the invention, useable in conjunction with the source code of FIG. 8.

FIGS. 9a and b correspondingly show a LabVIEW virtual instrument panel that can be displayed on the computer CRT 128 for use with software pursuant to FIGS. 8a and b.

The following paragraphs disclose a source code in the QuickBASIC programming language for execution within or in cooperation with the utility of Lab Windows, a programming environment published by National Instruments, for throughput optimization according to a further embodiment of the invention. In this example, a commercial stage of the type PM500 by Newport Corporation, acts as both the dither stage 20 and the alignment stage 43.

```
'Fiber Probing application
'Utilizes novel 2-D  coupling optimization within a larger
'program to perform 3-D optimization.  Aligns a multi-mode fiber
'to each of twenty lensed Light Emitting Diodes in a handling stick.

'Start with home position at diode #1

DIM SHARED Observed.X#(20),Observed.Y#(20),Observed.Z#(20)
DIM SHARED
    Regressed.X#(20),Regressed.Y#(20),Regressed.Z#(20),Index#(20)
    'for linear regression between diodes
DIM SHARED Final.X#,Final.Y#,Final.Z#,Manual.X#,Manual.Y#,Manual.Z#
DIM SHARED Where.To.Go.X#,Where.To.Go.Y#,Where.To.Go.Z#

COMMON SHARED /PM500.Axis.Position/PM500.Axis.Position#

Diode.Spacing# = -5892.0   'We've set negative away from motor (PM500
    "sign" is +1 for all axes)

CALL NCAUTO.Init (1, 5, 100.0, 18, 100.0, 50)    'ignore; just to set
    up communications CALL PM500.Set.Accels (0, 50.0)
CALL PM500.Set.Accels (1, 50.0)
CALL PM500.Set.Accels (2, 50.0)

CALL PM500.Clear.SRQ

CALL PM500.Home.Axis (2)
CALL PM500.Wait.For.SRQ
CALL PM500.Rel.Move (2, -5000.0)    'bring fiber out of the hole
CALL PM500.Wait.For.SRQ CALL PM500.Clear.Offset (0)
CALL PM500.Clear.Offset (1)
CALL PM500.Clear.SRQ
CALL PM500.Home.Axis (0)
```

```
CALL PM500.Home.Axis (1)
CALL PM500.Wait.For.SRQ
CALL PM500.Wait.For.SRQ for j%= 0 to 19
Index#(j%)=j%
Print " ******************************"
Print " ***** Homing-In on Diode #";j%+1;" *****"
Print " ******************************"
CALL PM500.Clear.SRQ
CALL PM500.Abs.Move (2, -5000.0)      'bring fiber out of the hole
CALL PM500.Wait.For.SRQ 'take Y axis (big stage) to target position IF j% <= 1 THEN     'we're on our first (j% = 0) or second (j% = 1)
        diode; do no regression
   Where.To.Go.Y# = Diode.Spacing# * j%
   Where.To.Go.Z# = 0
   CALL PM500.Read.Coord.and.Stat (0)
   CALL PM500.Parse.Status
   Where.To.Go.X# = PM500.Axis.Position#
ELSE
   CALL LinFit (Index#(), Observed.Y#(), j%, Regressed.Y#(), slope#,
        intercept#, mse#)
   Where.To.Go.Y# = intercept# + (Slope# * j%)
   CALL LinFit (Index#(), Observed.X#(), j%, Regressed.X#(), slope#,
        intercept#, mse#)
   Where.To.Go.X# = intercept# + (Slope# * j%)
   CALL LinFit (Index#(), Observed.Z#(), j%, Regressed.Z#(), slope#,
        intercept#, mse#)
   Where.To.Go.Z# = Slope# * j%     'correction factor applied to home
        position
END IF
```

```
CALL PM500.Clear.SRQ
CALL PM500.Abs.Move (1, Where.To.Go.Y#)
CALL PM500.Wait.For.SRQ
CALL PM500.Abs.Move (0, Where.To.Go.X#)
CALL PM500.Wait.For.SRQ 'now bring Z axis into the hole again -- note it's regressed too now
CALL PM500.Abs.Move (2,Where.To.Go.Z#)
CALL PM500.Wait.For.SRQ CALL NCAUTO.Init (1, 5, 120.0, 13, 700.0, 90)
'               ^--^--Addresses
'                     ^--Dither radius (um)
'                          ^--Dither Count
'                                ^--Profile Full-Width (um)
'                                         ^--Profile Count
'*** Next:
'*** Perform the 3 axis alignment
'*** The following subroutine call (documented separately) performs
     the following sequence:
'*** First align radially a safe distance away, using the new
     technique.
'*** Then profile the coupling radially.
'*** Then move in axially by a known increment.  Repeat the radial
     alignment.
'*** Profile a second time at this new a::ial distance.
'*** The axial separation can then be determined by 3-dimensional
     triangulation.
'*** This allows motion to proceed in a final approach to a desired
     distance.
'*** A final radial alignment is then performed at the desired
     distance.
'
CALL NCAUTO.Home.In.On.Diode (20.0, 0.14, 0.0, 700.0, 240.0, 0)
'                              ^--Gain
'                                   ^--Threshold
'                                         ^--Phase Shift (rad)
'                                                ^--Delta Z (um)
```

```
                                                        `-- final
                                                           dist. (um)
                                                        `--Status
                                                     print on/off CALL PM500.Read.Coord.and.Stat (2)
CALL PM500.Parse.Status
Final.Z# = PM500.Axis.Position#
Observed.Z#(j%) = PM500.Axis.Position#
CALL PM500.Read.Coord.and.Stat (0)
CALL PM500.Parse.Status
Final.X# = PM500.Axis.Position#
Observed.X#(j%) = PM500.Axis.Position#    'for our regression
CALL PM500.Read.Coord.and.Stat (1)
CALL PM500.Parse.Status
Final.Y# = PM500.Axis.Position#
Observed.Y#(j%) = PM500.Axis.Position#    'for our regression
Print "PM500 position (X Y Z) is now";Final.X#;Final.Y#;Final.Z# next j%

CALL PM500.Home.Axis (2)
CALL PM500.Wait.For.SRQ
CALL PM500.Rel.Move (2, -5000.0)      'bring fiber out of the hole
CALL PM500.Wait.For.SRQ CALL PM500.Home.Axis (0)
CALL PM500.Home.Axis (1)
CALL PM500.Wait.For.SRQ
CALL PM500.Wait.For.SRQ CALL PM500.Rel.Move (0, -5000.0)      'retract X axis so stick can be
      changed
CALL PM500.Wait.For.SRQ
```

The following pages or columns disclose another QuickBASIC source code for generalized multi-mode/-bulk optics implementation of an alignment technique according to an embodiment of the invention, including instrumentation code for discrete loop motions 16:

```
REM Copyright 1991 Newport Corporation

REM     $INCLUDE: 'C:\LW\INCLUDE\LWSYSTEM.INC'
REM     $INCLUDE: 'C:\LW\INCLUDE\GPIB.INC'
REM     $INCLUDE: 'C:\LW\INCLUDE\FORMATIO.INC'
REM     $INCLUDE: 'C:\LW\INCLUDE\GRAPHICS.INC'
REM     $INCLUDE: 'C:\LW\INCLUDE\ANALYSIS.INC'
REM     $INCLUDE: 'C:\LW\INSTR\NP_PM500.inc'     ' Newport PM500
    (GPIB) Motion System
REM     $INCLUDE: 'C:\LW\INSTR\hp8153A.inc'      ' HP 8153A Optical
    Power Meter
REM     $INCLUDE: 'C:\LW\instr\NCAUTO.INC'

DIM SHARED Last.Pass%
DIM SHARED X0#,Y0#,Z0#,X1#,Y1#,Delta.X#,Delta.Y#,In.Between#,Max#

'*****************************************************************

SUB NCAUTO.Init(PM500.Addr%,hp8153A.Addr%,D.Radius#, D.Count%,
        P.Width#, P.Count%)

Dither.Radius#=D.Radius#
 Dither.count%=D.Count%
 Profile.Width#=P.Width#
 Profile.Count%=P.Count%
 Pi#         = 3.1416

'Initialize instruments.  Be sure correct GPIB addresses are used.
 CALL PM500.init (PM500.Addr%)
 CALL PM500.Clear.Offset (0)
 CALL PM500.Clear.Offset (1)
 CALL PM500.Clear.Offset (2)

CALL PM500.Clear.SRQ

CALL PM500.Clear.SRQ
```

```
      CALL hp8153A.init (hp8153A.Addr%)

END SUB

'*****************************************************************

' Following subroutine is the main program for the fiber probing
      application.

SUB NCAUTO.Home.In.On.Diode(Gn#, Th#, Phse#, Z.Inc#, Min.Z#, Stat%)
REM Copyright 1991 Newport Corporation Gain#=Gn#
   Threshhold#=Th#
   Phase.Shift#=Phase#
   Z.Increment#=Z.Inc#
   Minimum.Z#=Min.Z#
   Status.Printout%=Stat%
   Last.Pass%=0

CALL PM500.Clear.SRQ

CALL NCAUTO.Go.To.Optimum(Gain#, Threshhold#)

CALL PM500.Read.Coord.and.Stat (0)
   CALL PM500.Parse.Status
   X0# = PM500.Axis.Position#
   CALL PM500.Read.Coord.and.Stat (1)
   CALL PM500.Parse.Status
   Y0# = PM500.Axis.Position#
   CALL PM500.Read.Coord.and.Stat (2)
   CALL PM500.Parse.Status
   Z0# = PM500.Axis.Position#
   CALL PM500.Clear.SRQ IF Status.Printout% = 1 THEN
```

```
    Print "   X0, Y0, Z0:";X0;Y0;Z0
END IF

CALL NCAUTO.Profile(Profile.Width#,Profile.Count%)
  Beam.Waist.1# = NCAUTO.Waist.Calculation#
  CALL PM500.Rel.Move (2, Z.Increment#)
  CALL PM500.Wait.For.SRQ Dither.Radius# = Dither.Radius#/4
  Profile.Width#=Profile.Width#/2
  Threshhold#=Threshhold# * 0.8

CALL NCAUTO.Go.To.Optimum(Gain#, Threshhold#)
  CALL PM500.Read.Coord.and.Stat (0)
  CALL PM500.Parse.Status
  X1# = PM500.Axis.Position#
  CALL PM500.Read.Coord.and.Stat (1)
  CALL PM500.Parse.Status
  Y1# = PM500.Axis.Position#
  Delta.X# = X1# - X0#
  Delta.Y# = Y1# - Y0#
  CALL PM500.Clear.SRQ IF Status.Printout% =1 THEN
    Print "   X1, Y1:";X1;Y1
  END IF CALL NCAUTO.Profile(Profile.Width#,Profile.Count%)
  Beam.Waist.2# = NCAUTO.Waist.Calculation#
  CALL NCAUTO.Calculate.Z
  CALL PM500.Abs.Move (0, (X0# + (Delta.X# / Z.Increment#) *
       (Z.Increment# + Z.Proximity# - Minimum.Z#)))
  CALL PM500.Abs.Move (1, (Y0# + (Delta.Y# / Z.Increment#) *
       (Z.Increment# + Z.Proximity# - Minimum.Z#)))
  CALL PM500.Wait.For.SRQ
  CALL PM500.Wait.For.SRQ
  CALL PM500.Rel.Move (2, Z.Proximity#-Minimum.Z#)
  CALL PM500.Wait.For.SRQ
```

```
'Final dither if necessary
 Last.Pass%=0     'make 1 if you want median readings taken; 0 if
      single-readings are okay
 CALL NCAUTO.Go.To.Optimum(Gain#, Threshhold#)

'Now you are centered and as close to the diode as you want to be.
CALL hp8153A.measure.Ch1 (trash#)  'a few readings to ensure settling
CALL hp8153A.measure.Ch1 (trash#)
CALL hp8153A.measure.Ch1 (trash#)
CALL SetDisplayMode (0)

If Status.Printout% = 1 THEN
 CALL PM500.Read.Coord.and.Stat (0)
 CALL PM500.Parse.Status
 Print "Final X, Y, Z:";PM500.Axis.Position#;
 CALL PM500.Read.Coord.and.Stat (1)
 CALL PM500.Parse.Status
 Print PM500.Axis.Position#;
 CALL PM500.Read.Coord.and.Stat (2)
 CALL PM500.Parse.Status
 Print PM500.Axis.Position#
END IF Print "* Diode output is ";NCAUTO.Readings.Median#;"*"
Print "* END PROGRAM *"
CALL PM500.Clear.SRQ

END SUB

'***************************************************************

SUB NCAUTO.Move.To.Specified.Diode(Diode%,Diode.Spacing#)
 CALL PM500.Clear.SRQ
 CALL PM500.Rel.Move (0, Diode.Spacing#*Diode%)
 CALL PM500.Wait.For.SRQ
END SUB

'***************************************************************
```

...Cogworks...

'*****************************************************************

```
SUB NCAUTO.Close
 CALL PM500.close
 CALL hp8153A.close
END SUB
```

'*****************************************************************

```
SUB NCAUTO.Off.Motors
    'Allow operator to position probe.
    CALL PM500.Off.Motor (0)
    CALL PM500.Off.Motor (1)
    CALL PM500.Off.Motor (2)
    CALL PM500.Clear.SRQ
END SUB
```

'*****************************************************************

```
SUB NCAUTO.Go.To.Home.Positions
 CALL PM500.Clear.SRQ

CALL PM500.Home.Axis (2)      ' retract Z first
 CALL PM500.Wait.For.SRQ
 CALL PM500.Home.Axis (0)
 CALL PM500.Home.Axis (1)
 CALL PM500.Wait.For.SRQ
 CALL PM500.Wait.For.SRQ
END SUB
```

'*****************************************************************

```
SUB NCAUTO.Go.To.Rough.Origin
 CALL PM500.Clear.SRQ
 CALL PM500.Seek.Fiducial (2)
 CALL PM500.Wait.For.SRQ
```

```
    CALL PM500.Seek.Fiducial (0)

CALL PM500.Seek.Fiducial (1)

CALL PM500.Wait.For.SRQ

CALL PM500.Wait.For.SRQ

CALL NCAUTO.Call.This.Home

END SUB

'*******************************************************************

SUB NCAUTO.Call.This.Home
    CALL PM500.Clear.Position (0)

CALL PM500.Clear.Position (1)

CALL PM500.Clear.Position (2)

CALL PM500.Clear.SRQ

END SUB

'*******************************************************************

SUB NCAUTO.Dither(Dither.Radius#,Dither.Count%)
REM Copyright 1991 Newport Corporation If Status.Printout%=1 THEN
'       Print "Calling NCAUTO.Dither..."
    ENDIF CALL PM500.Offset.To.This.Position (0)

CALL PM500.Offset.To.This.Position (1)

CALL PM500.Clear.SRQ

Delta.Theta# = -(2 * Pi#/Dither.Count%)

For i%=0 to Dither.Count%-1
      CALL PM500.Abs.Move (0,Dither.Radius# * cos(Delta.Theta# * i%))
      CALL PM500.Abs.Move (1,Dither.Radius# * sin(Delta.Theta# * i%))
      CALL PM500.Wait.For.SRQ
      CALL PM500.Wait.For.SRQ
```

```
if i%=0 then
   CALL hp8153A.measure.Ch1(trash#)  'allows time for settling at
      edge of dither
endif IF Last.Pass%=0 then
  CALL hp8153A.measure.Ch1 (Dither.Array#(i%))
Else
  Dither.Array#(i%)=NCAUTO.Readings.Median#
ENDIF next i%
CALL PM500.Home.Axis (0)
CALL PM500.Home.Axis (1)
CALL PM500.Wait.For.SRQ
CALL PM500.Wait.For.SRQ CALL PM500.Clear.Offset (0)
CALL PM500.Clear.Offset (1)
CALL PM500.Clear.SRQ If Status.Printout%=1 THEN
  CALL GrfReset (4)
  CALL SetPlotMode (0)
  CALL SetCurv2D (1)
  CALL GrfYCurv2D (Dither.Array#(), Dither.Count%)
' Print "  NCAUTO.Dither complete."
ENDIF
END SUB

'*****************************************************************
    ****

SUB NCAUTO.Profile(Profile.Width#,Profile.Count%)
 If Status.Printout%=1 THEN
' Print "Calling NCAUTO.Profile..."
 ENDIF
 CALL hp8153A.measure.Ch1(trash#)
```

```
Half.Width#=Profile.Width#/2
Mesh#=-1*Profile.Width#/Profile.Count%

CALL PM500.Clear.SRQ
   CALL PM500.Rel.Move(0,Half.Width#)
   CALL PM500.Wait.For.SRQ
   CALL PM500.Preset.Rel.Move (0,Mesh#)
   CALL PM500.Clear.SRQ
   CALL hp8153A.measure.Ch1(trash#)   'allows time for settling at edge
       of profile for i%=0 to Profile.Count%-1

CALL hp8153A.measure.Ch1(trash#)   'allows time for auto-ranging,
       etc.
   CALL hp8153A.measure.Ch1 (Profile.Array#(i%))
   CALL PM500.Move.By.Preset.Increment (0)
   CALL PM500.Wait.For.SRQ
   next i%

CALL PM500.Rel.Move(0,Half.Width#)
   CALL PM500.Wait.For.SRQ

If Status.Printout%=1 THEN
     CALL GrfReset (4)
     CALL SetPlotMode (0)
     CALL SetCurv2D (1)
     CALL GrfYCurv2D (Profile.Array#(), Profile.Count%)
   '   Print "  NCAUTO.Profile complete."
   ENDIF
END SUB

'*****************************************************************

FUNCTION NCAUTO.Waist.Calculation#
  IF Status.Printout%=1 then
  'Print "Calling NCAUTO.Waist.Calculation#..."
  ENDIF
```

```
Waist.Factor#= 0.2
Left.Side%=0
CALL MaxMin (Profile.Array#(), Profile.Count%, Max#, Max.Index%,
     trash#, trashint%)

'Left Edge:
 i%=Max.Index%
 WHILE (Profile.Array#(i%) > Max# * Waist.Factor#) AND (i% <=
     Profile.Count%-1)
 i% = i% + 1      ' i% will end up being the index of the half-
     width point
WEND
IF i% = Profile.Count%-1 THEN
 Print "****************************************************"
 Print "***    Right edge of profile not observed.      ***"
 Print "***        Try a larger profiling-width,        ***"
 Print "***    or bring the Z axis closer to the chip.  ***"
 Print "****************************************************"
 CALL NCAUTO.Off.Motors
 STOP
ENDIF
    in.between# = i% - (((Max# * Waist.Factor#) -
    Profile.Array#(i%)) / (Profile.Array#(i%-1) -
    Profile.Array#(i%)))
    right.edge# = (in.between# - Max.Index%) *
    Profile.Width#/Profile.Count%   'in um
    IF Status.Printout% = 1 THEN
    print " Array and calculated RIGHT index and width: ";i%;
    in.between#;right.edge#
    END IF 'Right Edge:
i%=Max.Index%
WHILE (Profile.Array#(i%) > Max# * Waist.Factor#) AND (i% >= 0)
 i% = i% - 1      ' i% will end up being the index of the half-
     width point
WEND
IF i% = 0 THEN
 Print "****************************************************"
```

```
Print "***    Left edge of profile not observed.        ***"
Print "***       Try a larger profiling-width,          ***"
Print "***   or bring the Z axis closer to the chip.    ***"
Print "****************************************************"
CALL NCAUTO.Go.To.Home.Positions
CALL NCAUTO.Off.Motors
   STOP
  ENDIF
     in.between# = i% + (((Max# * Waist.Factor#) -
     Profile.Array#(i%)) / (Profile.Array#(i%+1) -
     Profile.Array#(i%)))
     Left.Edge# = (Max.Index% - in.between#) *
     Profile.Width#/Profile.Count%   'in um
     IF Status.Printout% = 1 THEN
      print "  Array and calculated LEFT index and width: ";i%;
      in.between#; left.edge#
     END IF tempreal# = Left.Edge# + Right.Edge#
 NCAUTO.Waist.Calculation = tempreal#

IF Status.Printout%=1 then
   Print "  NCAUTO.Waist.Calculation complete; Waist = ";tempreal#
 ENDIF
END FUNCTION

'****************************************************************

SUB NCAUTO.Find.Optimum.Theta(Dither.Count%)
REM Copyright 1991 Newport Corporation
 IF Status.Printout%=1 THEN
 ' Print "Calling NCAUTO.Find.Optimum.Theta..."
 ENDIF Theta.Increment# = -2 * Pi# / Dither.Count%
 ' The variable PhaseShift# allows accommodation of different
     fixturing.
```

```
    CALL MaxMin (Dither.Array#(), Dither.Count%, Max#, Max.Index%,
        Min#, Min.Index%)
Opt.Theta# = (Max.Index% * Theta.Increment#) + PhaseShift#
Err.Signal# = (Max# - Min#)/Min#
IF Status.Printout%=1 THEN
  Print "   NCAUTO.Find.Optimum.Theta complete, Err.Signal#
      =";Err.Signal#
  Print "                                          Max = ";Max#;" Min =
      ";Min#
  Print "                                          Opt.Theta#
      =";Opt.Theta#
ENDIF

END SUB

'********************************************************************

SUB NCAUTO.Go.To.Optimum (Gain#,threshhold#)
REM Copyright 1991 Newport Corporation IF Status.Printout% = 1 then
'   Print "Calling NCAUTO.Go.To.Optimum..."
 ENDIF Err.Signal#=99

Iteration%=0
 WHILE Err.Signal# >= Threshhold#
   Iteration%=Iteration%+1

IF Status.Printout%=1 then
'    Print "   Iteration";Iteration%
   ENDIF

IF Iteration% = 30 THEN    'assume we're not going anywhere-- too
       close
       Print "Apparently we're not getting there.  Chip too close?
           Cutting radius..."
```

```
      Dither.Radius# = Dither.Radius# / 2
    END IF

IF Iteration%>60 THEN
      print "too many iterations. (";iteration%;")  Halting execution."
      STOP
    ENDIF CALL NCAUTO.Dither(Dither.Radius#,Dither.Count%)
    CALL NCAUTO.Find.Optimum.Theta(Dither.Count%)

IF Max# < 1.0E-9 THEN                'allow user to manually bring diode
        in range
      CALL NCAUTO.Off.Motors
      CALL HP8153A.Turn.On.Display
      Print "*********************************************"
      Print "***     Diode too far out of range.       ***"
      Print "***     Manually adjust, then hit F4      ***"
      Print "***         to resume operation           ***"
      Print "*********************************************"
      CALL breakpoint
      CALL PM500.Transfer.To.This.Position(0)
      CALL PM500.Transfer.To.This.Position(1)
      CALL PM500.Transfer.To.This.Position(2)
      CALL HP8153A.init (5)
      Error.Signal#=Threshhold# * 1.01   'to ensure it doesn't think
          it's finished
  END IF Opt.Radius#= Gain# * (Err.Signal#)   ' Note: goes to zero at
       optimum
    IF Opt.Radius# > (Dither.Radius# * 2) THEN
     Opt.Radius# = (Dither.Radius# * 2)
    ENDIF
    CALL NCAUTO.XY.Interpolate(Opt.Radius#, Opt.Theta#)
WEND
  IF Status.Printout% = 1 then
  '  Print "   NCAUTO.Go.To.Optimum complete."
   ENDIF
```

END SUB

'****************************************************************

SUB NCAUTO.XY.Interpolate(Opt.Radius#,Theta#)

' note: this does not really interpolate, though the PM500 is
        capable of it.
  If Status.Printout%=1 Then
'    Print "Calling NCAUTO.XY.Interpolate..."
  ENDIF X.Chord# = Cos(Theta#) * Opt.Radius#
  Y.Chord# = Sin(Theta#) * Opt.Radius#

CALL PM500.Clear.SRQ
  CALL PM500.Rel.Move (0, X.Chord#)
  CALL PM500.Rel.Move (1, Y.Chord#)
  CALL PM500.Wait.For.SRQ
  CALL PM500.Wait.For.SRQ If Status.Printout%=1 Then
'    Print "   NCAUTO.XY.Interpolate complete... r=";Opt.Radius#;"
        Theta=";Theta#
  ENDIF

END SUB

'****************************************************************

FUNCTION NCAUTO.Readings.Median#
  For i%=0 to 9
    CALL hp8153A.measure.Ch1 (Reading#(i%))
  next i%
  CALL Median (Reading#(), 10, Mid.Value#)
  NCAUTO.Readings.Median# = Mid.Value#
END FUNCTION

'****************************************************************

```
SUB NCAUTO.Calculate.Z                   ' Simple congruenttriangles method

Delta.Waist#  =  Beam.Waist.1# - Beam.Waist.2#

Z.Proximity#  =  (Z.Increment# * Beam.Waist.2#) / Delta.Waist#

END SUB
```

`'********************************************************************`

END

I claim:

1. A method of maximizing throughput between two objects, of a physical quantity having a substantially unimodal throughput profile in terms of relative orientation of said objects, comprising in combination:

transmitting said physical quantity between said objects at other than optimum throughput in said substantially unimodal throughput profile;

imposing on said objects relative movement in loops in said substantially unimodal throughput profile;

detecting throughput intensities at different specific points along said loops;

arranging detected throughput intensities at corresponding different specific points in an array;

identifying from said array the relative orientation of said objects at which a maximum throughput has occurred; and moving said objects unto said relative orientation.

2. A method as in claim 1, including in said combination:

continuing relative movement of said objects in further loops from said relative orientation;

detecting further throughput intensities at further different specific points along said further loops;

arranging detected further throughput intensities and corresponding further different specific points in a further array;

identifying from said further array a further relative orientation of said objects at which a further maximum throughput has occurred during said continuing relative movement; and moving said objects unto said further relative orientation.

3. A method as in claim 1, wherein:

occurrence of said different specific points is determined by timing;

said detected throughput intensities are arranged in terms of corresponding points of time in an array from which the point of time at which an extreme throughput intensity has occurred is identified; and said objects are relatively moved unto a relative orientation for maximum throughput with the aid of said identified point of time.

4. A method as in claim 1, wherein:

occurrence of said different specific points is determined in terms of corresponding different polar angles in said loops;

said detected throughput intensities are arranged in terms of said corresponding different specific angles in an array from which the polar angle at which an extreme throughput intensity has occurred is identified; and said objects are relatively moved unto a relative orientation for maximum throughput along a vector having said polar angle.

5. A method as in claim 4, wherein:

maximum and minimum throughput intensities are detected during said relative movement; and said objects are relatively moved along said vector in accordance with $$d = G(I_{max} - I_{min})/I_{min}$$

wherein:

d is distance of movement,

G is gain of motion, $I_{max}$ is said maximum throughput intensity, and $I_{min}$ is said minimum throughput intensity.

6. A method as in claim 5, wherein:

relative movement of said objects, detection of maximum and of minimum throughput intensities, and relative movement of said objects along a vector having the polar coordinate representing an extreme throughput according to the equation $$d = G(I_{max} - I_{min})/I_{min}$$

are repeated until $I_{min}$ and $I_{max}$ are substantially equal.

7. A method as in claim 6, wherein:

gain of motion, G, is progressively diminished to prevent overshoots.

8. A method as in claim 4, wherein:

the maximum throughput intensity in said array is selected as said extreme throughput intensity; and said vector is the vector having the polar coordinate at which that maximum throughput intensity occurred.

9. A method as in claim 4, wherein:

the minimum throughput intensity in said array is selected as said extreme throughput intensity; and said vector is determined as substantially a 180° reversal of the polar coordinate at which that minimum throughput intensity occurred.

Figure 6B:
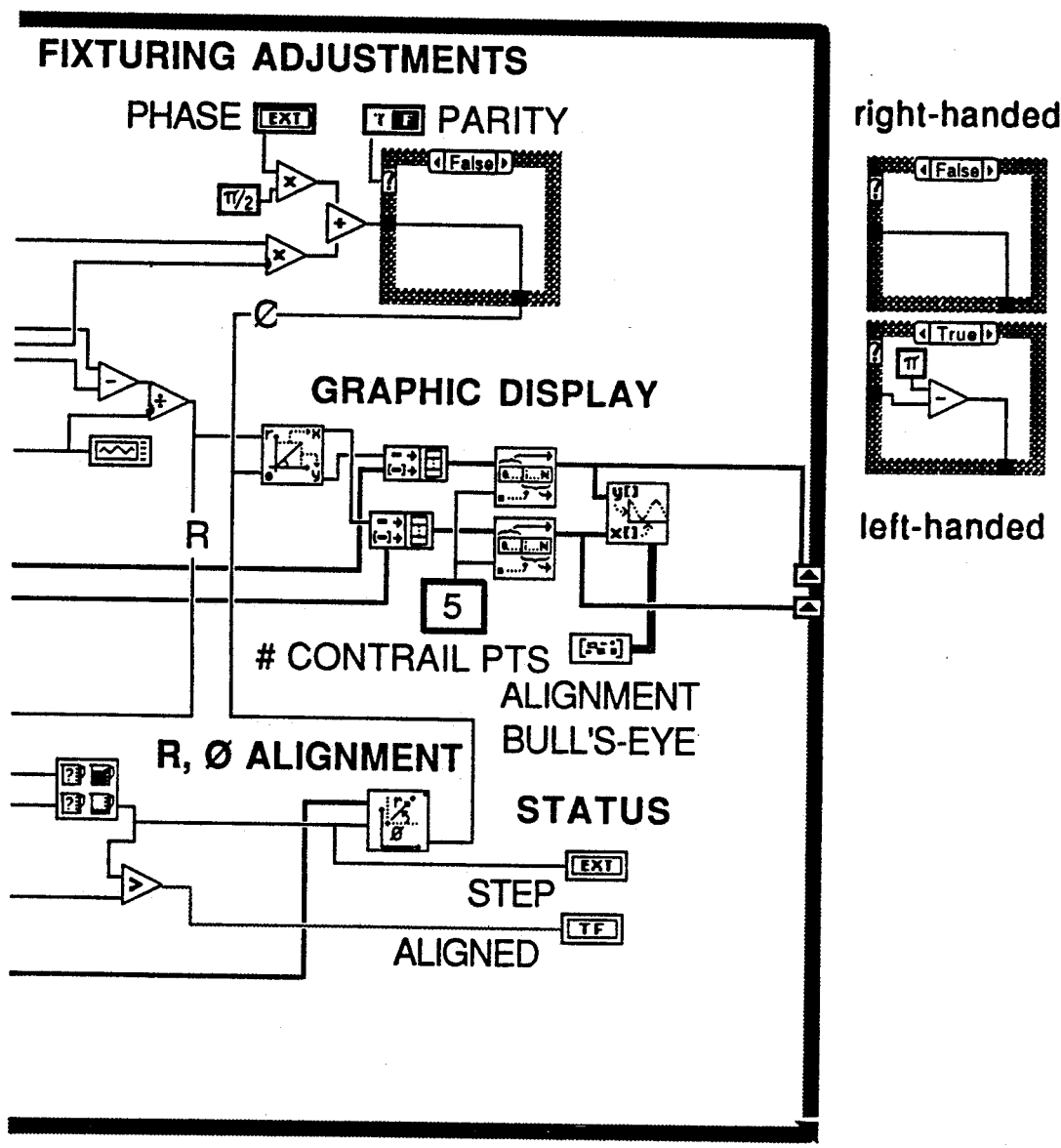
Figure 7A:
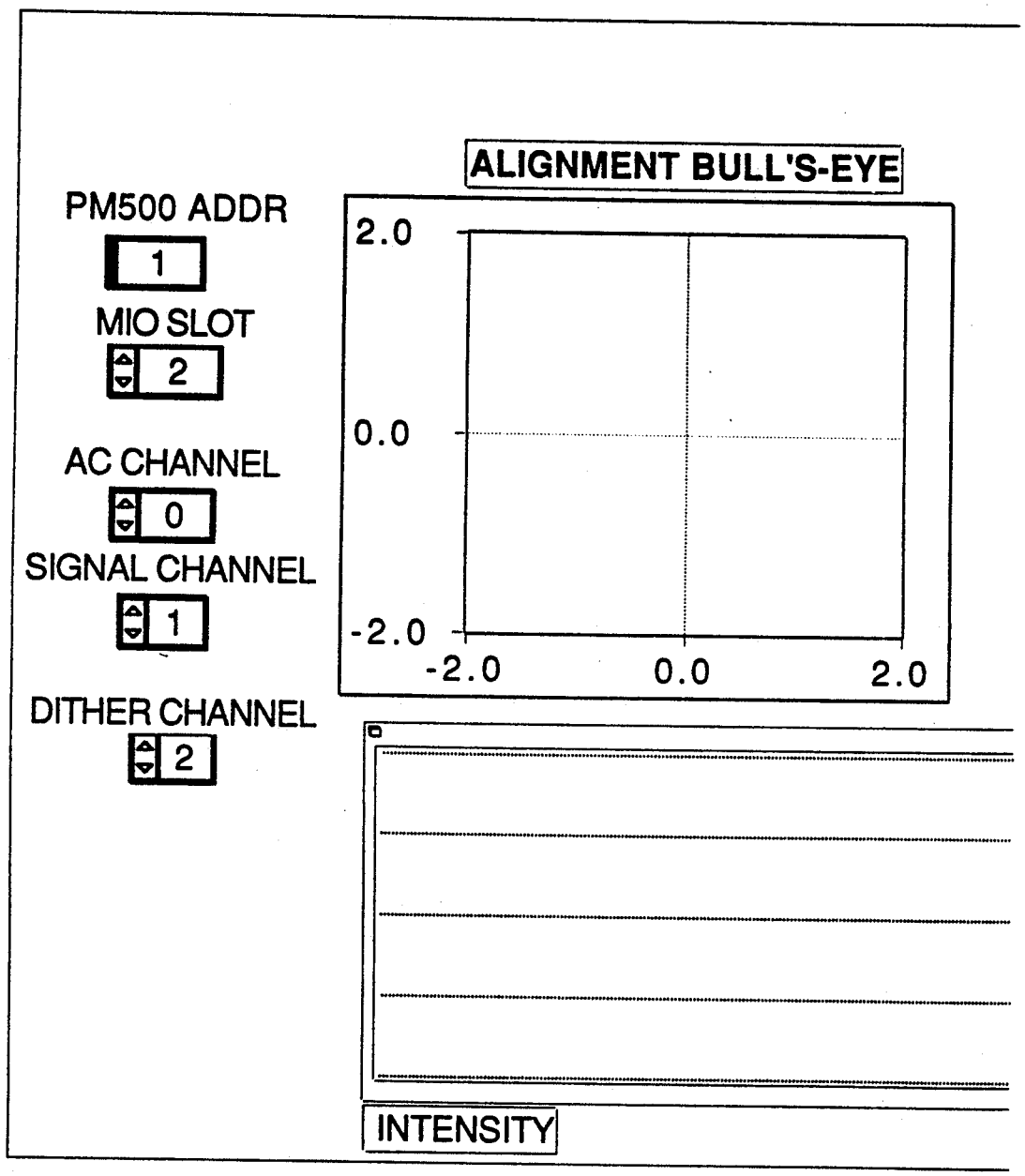
FIGS. 7a and b show a display of a LabVIEW virtual instrument panel according to a related embodiment of the invention, useable in conjunction with the source code of FIG. 6.

10. A method as in claim 1, including in said combination:

employing software according to the LabVIEW source code of FIG. 6 for at least imposing on said objects relative movement in loops in said substantially unimodal throughput profile, detecting throughput intensities at different specific points along said loops, arranging detected throughput intensities and corresponding different specific points in an array, and identifying from said array the relative orientation of said objects at which a maximum throughput has occurred.

Figure 7B:
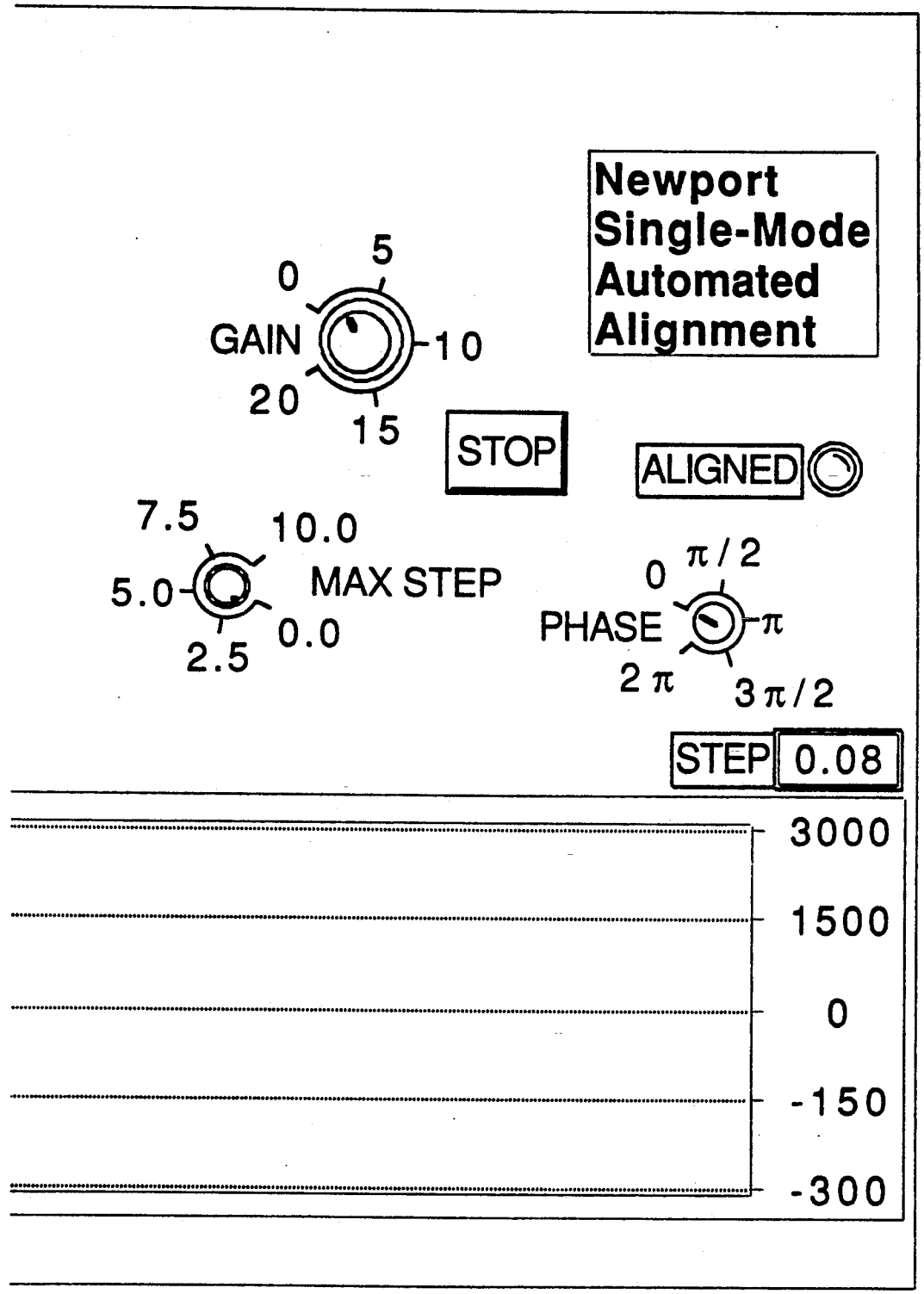

11. A method as in claim 10, wherein:
employment of said software is facilitated with the LabVIEW virtual instrument panel of FIG. 7.

Figure 8B:
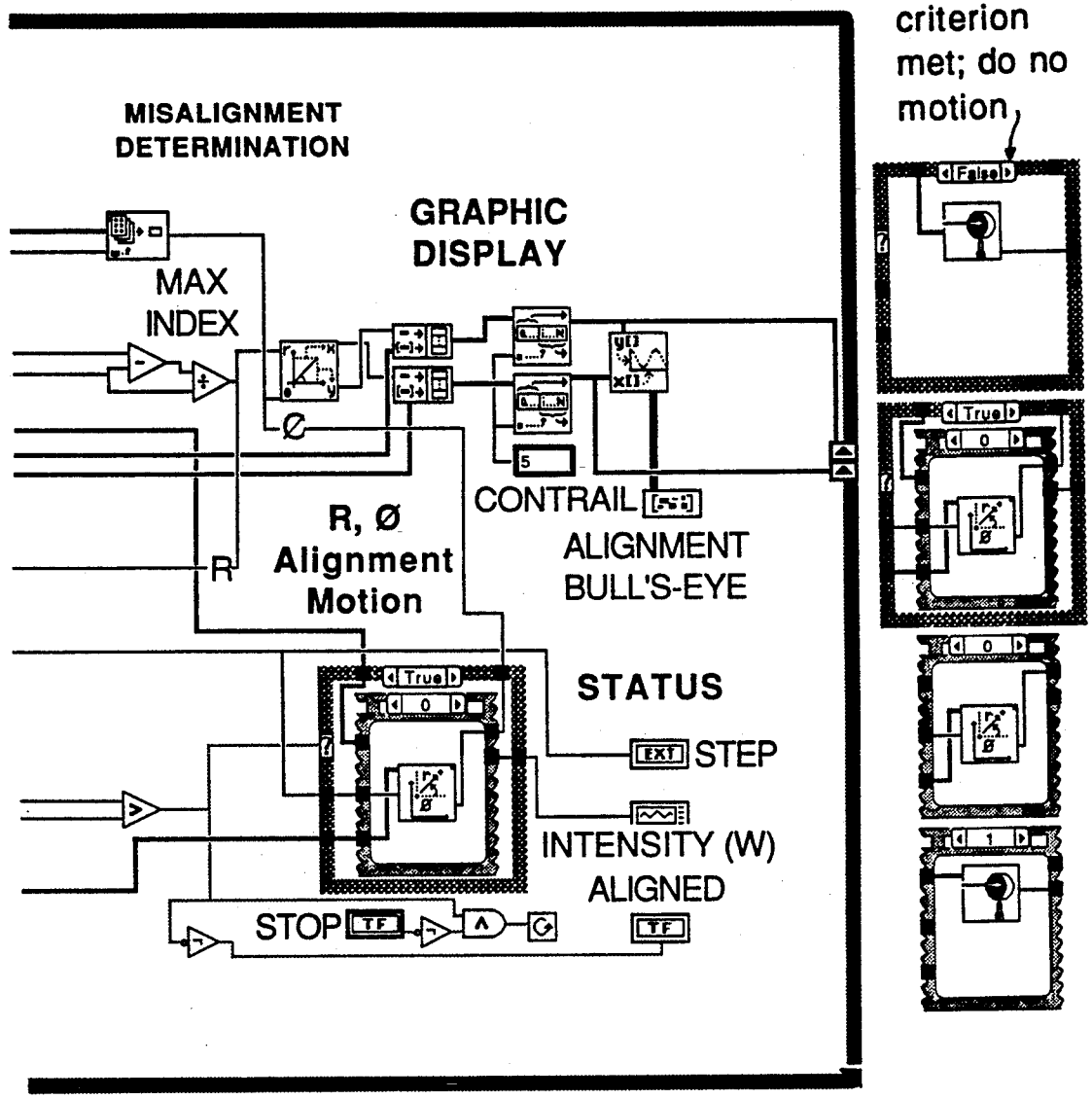

12. A method as in claim 1, including in said combination:
employing software according to the LabVIEW source code of FIG. 8 for at least imposing on said objects relative movement in loops in said substantially unimodal throughput profile, detecting throughput intensities at different specific points along said loops, arranging detected throughput intensities and corresponding different specific points in an array, and identifying from said array the relative orientation of said objects at which a maximum throughput has occurred.

Figure 9B:
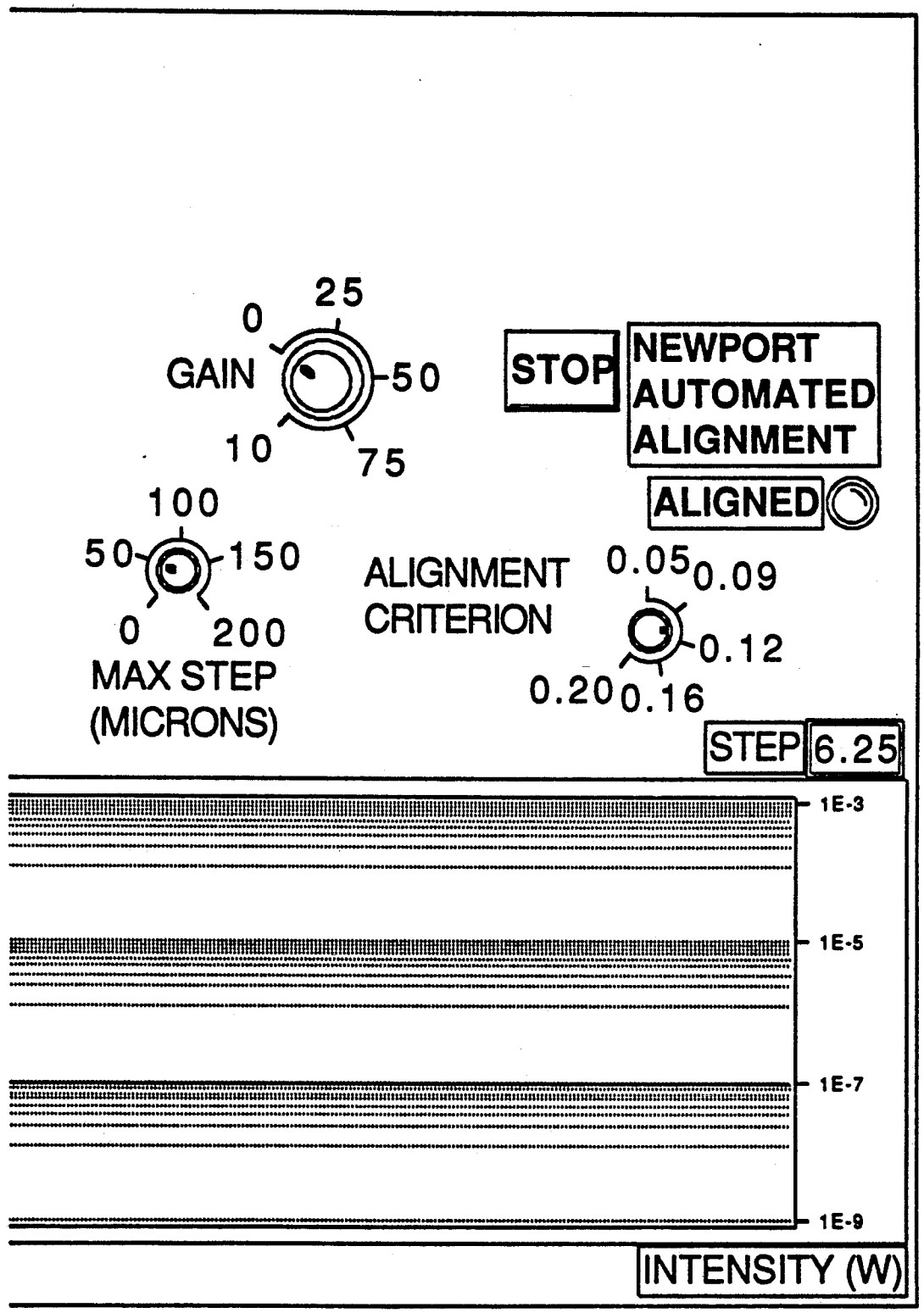

13. A method as in claim 12, wherein:
employment of said software is facilitated with the LabVIEW virtual instrument panel of FIG. 9.

14. A method as in claim 1, including:
displaying on an enlarged scale a discrepancy between an actual relative orientation and the relative orientation of said objects at which maximum throughput has occurred.

15. In apparatus for maximizing throughput between two objects, of a physical quantity having a substantially unimodal throughput profile in terms of relative orientation of said objects,
the improvement comprising in combination:
means for transmitting said physical quantity between said objects at other than optimum throughput in said substantially unimodal throughput profile;
means for imposing on said devices relative movement in loops in said substantially unimodal throughput profile;
means for detecting throughput intensities at different specific points along said loops;
means connected to said detecting means for arranging detected throughput intensities at corresponding different specific points in an array; and
means for identifying from said array the relative orientation of said objects at which a maximum throughput has occurred for movement of said objects unto said relative orientation.

16. Apparatus as in claim 15, including:
means for displaying on an enlarged scale a discrepancy between an actual relative orientation and the relative orientation of said objects at which maximum throughput has occurred.

17. Apparatus as in claim 15, including:
means for moving said objects unto said further relative orientation.

18. In apparatus for maximizing throughput between two objects, of a physical quantity having a substantially unimodal throughput profile in terms of relative orientation of said objects,
the improvement comprising in combination:
means for transmitting said physical quantity between said objects at other than optimum throughput in said substantially unimodal throughput profile;
means for imposing on said devices relative movement in loops in said substantially unimodal throughput profile;
means for detecting throughput intensities at different polar angles along said loops;
means connected to said detecting means for arranging detected throughput intensities at corresponding polar angles in an array; and
means for identifying from said array the relative orientation of said objects at which a maximum throughput has occurred for movement of said objects unto said relative orientation.

19. Apparatus as in claim 18, including:
means for displaying on an enlarged scale a discrepancy between an actual relative orientation and the relative orientation of said objects at which maximum throughput has occurred.

20. Apparatus as in claim 18, including:
means for relatively moving said objects along a vector having the polar coordinate at which an extreme throughput intensity has occurred in said array.

* * * * *